(No Model.)
A. McFARLAND.
BENCH HOOK.
No. 532,387. Patented Jan. 8, 1895.
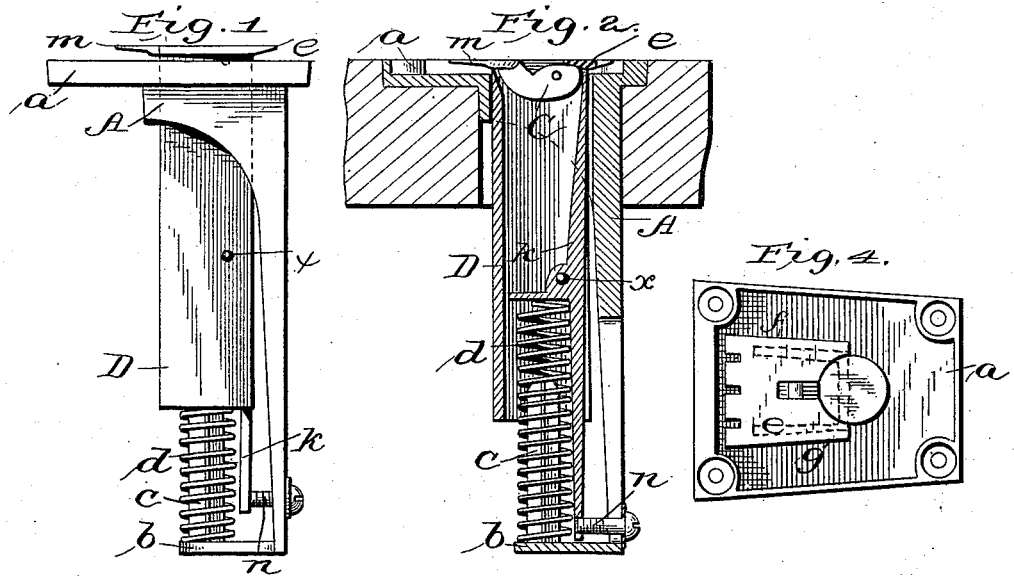
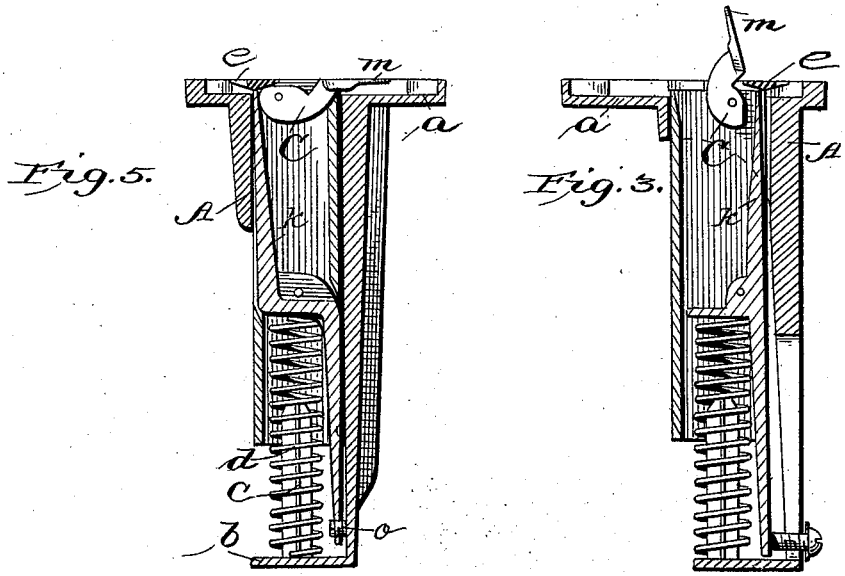
Attest
Wm. F. Hall
Walter N. Maldsay
Inventor
Andrew McFarland
by Ellis Spear
Atty
THE NORRIS PETERS CO., PHOTO-LITHO., WASHINGTON, D. C.

UNITED STATES PATENT OFFICE.

ANDREW McFARLAND, OF THOMASTON, MAINE.

BENCH-HOOK.

SPECIFICATION forming part of Letters Patent No. 532,387, dated January 8, 1895.

Application filed November 1, 1894. Serial No. 527,648. (No model.)

*To all whom it may concern:*

Be it known that I, ANDREW McFARLAND, a citizen of the United States of America, residing at Thomaston, in the county of Knox and State of Maine, have invented certain new and useful Improvements in Bench-Hooks, of which the following is a specification.

My said invention relates to that class of bench hooks, in which the hook is supported upon a spindle or stem, arranged to work vertically in a socket which is set in the bench, and is provided with means for holding the hook in any desired position.

My invention relates particularly to the means for adjusting and holding the hook in position, and the object of the invention is to provide a simple, inexpensive and effective device, which may be readily applied to the bench and is not liable to get out of order.

I have illustrated my invention in the accompanying drawings, in which—

Figure 1, shows the complete device, in side elevation. Fig. 2, shows a central vertical section of the hook in place in a bench. Fig. 3, is a similar view of the hook with the cam lever raised. Fig. 4, shows a plan view of the upper face of the hook and its socket. Fig. 5, shows a modification of the fastening lever and its socket connections.

In the drawings I have shown at A, a socket adapted to be inserted in a bench from the upper surface. The flange $a$, at the upper end is to be countersunk in the face of the bench and may be held by screws. The upper face of the socket and flange are recessed to receive the hook and the thumb piece of the fastening cam. The socket may be open below, but it is provided with a bottom piece, or ledge $b$, having a stud $c$, to hold the lifting spring $d$. The hook $e$ is formed upon the edge of a horizontal flange on the upper end of a sleeve D. Preferably the hook is wider than the sleeve, and is continuous with side flanges $f$ and $g$. This sleeve D fits snugly in the socket but is free to be moved up or down, and when down to the limit of its movement, the flanges and hook lie in the recess with the upper surface of the flanges and the end of the sleeve, flush with the upper surface of the socket. This form of the socket and vertical sleeve, with its hook, is convenient as it is complete in itself and is capable of being set in the bench, in an opening in the top thereof, and to be secured on the upper surface. In connection with this form of socket and sleeve hook, and especially adapted thereto is my improved fastening or locking device, by means of which the hook may be locked in any desired position. The leading feature of this device is that it is located in the sleeve and operated by a thumb piece or lever, which when down, lies in flush with or below the upper end surface of the sleeve. As shown herein, in the form represented by the principal figures, one side of the sleeve is open, and is provided with a lever $k$, pivoted at an intermediate point in the sleeve, to oscillate in and out. At the upper end is a cam or eccentric C pivoted in the sleeve, and provided with a thumb piece or extension $m$, which when the cam is turned with its high part against the inner face of the upper end of the lever $k$, lies flush with or below the upper face of the hook and sleeve. The lower end of the lever has sliding connection with the socket by means of a screw $n$, fixed in the lever and sliding in a slot in the socket with the head outside and bearing on the outer face of the socket, with preferably an interposed washer. This affords the vertically adjustable lock, for, to whatever point the sleeve may be raised when the thumb piece is up and the cam released, the thumb piece may be turned down, and thereby the upper end of the lever pressed out, which (the screw being properly adjusted) draws in the lower end of the lever and causes the screw head to bind on the socket. The thumb piece is always easily manipulated and the leverage of the parts gives sufficient grip to lock the sleeve, without the exertion of much force upon the piece.

In order that the hook may be raised automatically I provide preferably a coiled spring $d$, of which the lower end rests upon the case ledge, and the upper bears against some part of the sleeve or its connections. In Fig. 2 it is shown as bearing against an offset on the lever. The arrangement causes it to lift the sleeve and hook when said sleeve is released. The thumb piece extends to the rear of the sleeve, and lies in the cavity of the socket, when the sleeve is in its lowest position. In Fig. 5 the lever is modified in this respect. It is made with an offset so that the upper part of the lever comes to the front of the sleeve, which is open above, while the lower part extends to the open rear of the sleeve. The extension of the socket is in this form on the rear side, and the cam causes the lower end of the lever to bear directly upon this to cause the binding and locking effect. A screw o is set in the lower end of this lever, to regulate the pressure upon the socket. This connection also slides upon the socket and in both forms whatever the height to which the hook sleeve is raised, the lock has the same relation thereto, being always at the lower end.

I claim—

1. A bench hook, consisting of a socket, a sleeve provided with the hook, and arranged to slide vertically in the socket, a locking lever in the sleeve, and a cam provided with a thumb piece, in the sleeve, all substantially as described.

2. In combination with a socket, the vertically sliding sleeve, the lever pivoted thereon and having sliding connection with the socket at its lower end, and an eccentric having a thumb piece pivoted in the upper end of the sleeve and arranged to lie when down in a recess in the sleeve and flush with or below the surface of the hook, substantially as described.

In testimony whereof I affix my signature in presence of two witnesses.

ANDREW McFARLAND.

Witnesses:
JOHN T. RICHS,
WM. J. SINGER.